UNITED STATES PATENT OFFICE.

TADASHI MONIWA, OF AKASAKA, TOKYO, JAPAN.

CEMENT.

1,233,101.　　　Specification of Letters Patent.　　Patented July 10, 1917.

No Drawing.　　Application filed May 22, 1916.　Serial No. 99,229.

*To all whom it may concern:*

Be it known that I, TADASHI MONIWA, a subject of the Emperor of Japan, residing at Akasaka, in the city of Tokyo, in the Empire of Japan, have invented certain new and useful Improvements in Cement, of which the following is a specification.

This invention relates to a new or improved cement.

Although numerous joining cements are already known, their uses are in most cases limited, or they are only mechanically attached, or are simply held in position by pressure, or, though they may adhere well for a length of time, they gradually lose their cohesive power under long exposure to light and heat. To maintain permanent cohesion it requires that the coefficient of expansion of the cement shall be equal to or approximately equal to that of the substances or faces to be cemented, but this important rule has hitherto been overlooked.

Ordinary cement used for joining brick or stone has almost the same coefficient of expansion as materials to be joined, and in this respect must be regarded as quite effective. At the same time, however, it has the great drawbacks in that it requires moisture in its chemical hardening, and can only be used with substances having absorbent faces, or else requires sufficiently rough faces to effect mechanical attachment. Such substances or materials, therefore, as glass, enameled wares, etc., the coefficient of expansion of which differs considerably from that of ordinary cement, and which, moreover, are of a non-absorbent nature, and have smooth surfaces, can never be satisfactorily joined with ordinary cement. For this reason ornamental or glazed bricks are usually provided with hollows and notches or hooks to effect mechanical attachment of the cement. Many kinds of ornamental or glazed bricks made of porcelain and earthenware are glazed only on the outside faces, the other faces being left rough and absorbent, and when they are joined with ordinary cement the latter soaks through or penetrates the absorbent body of the brick and stains the glazed face and produces a very unsightly appearance.

The object of this invention is to provide a cement by means of which such substances of things as glass, enameled ware, glazed porcelain, earthenware and the like having smooth surfaces and of a non-absorbent nature and which are generally recognized as being almost impossible to cement together or to other substances or things with perfect cohesion by known cementing agents, such as ordinary cement, mortar, etc., can be cemented together or to faces of ordinary cement, mortar or plaster work, wood, stone, brick, etc., in such a manner that cohesion will be practically perfect and permanent and without, in the case of absorbent substances, any staining thereof.

The invention consists, essentially, in the utilization of asphalt as a cementing agent.

Asphalt (of Japanese) production usually consists of about 48% of mineral matters and about 52% of principal elements. The principal elements usually consist of about 17 parts of asphaltene and about 35 parts of petrolene. Petrolene is soluble in carbon bisulfid and kerosene, but asphaltene is quite insoluble in kerosene, hence the quantities of these two elements in any particular sample of asphalt can be readily calculated. The mineral matters referred to generally exist in the form of pulverized minerals and have, when at a high temperature, the property of somewhat retarding the melting of the petrolene and asphaltene. By utilizing this characteristic property and adding quantities of non-melting mineral matter or matters, such as powdered quartz, asbestos, etc., in such a measure as to retard the melting of the superfluous petrolene, the coefficient of expansion of the mixture may be made the same or practically the same as that of the substance to be cemented. By this means a cement having the same or practically the same degree of hardness and coefficient of expansion as the substance to be cemented can be prepared and the substance and cement will, therefore, separate only under the application of destructive force.

By numerous experiments it has been ascertained that a cement particularly suitable for cementing wood, glass, enameled porcelain, earthenware and the like to, for example, the surface of wood, may be composed of

|  | Parts. |
|---|---|
| Petrolene | 20–25 |
| Asphaltene | 14–17 |
| Non-melting mineral matter or matters such as powdered quartz, asbestos, and the like | 66–58 |

The melting point of such a cement is about 428°–410° F. (220°–210° C.).

A cement of the proportions given will have a degree of hardness and coefficient of expansion practically equal to those of the surfaces to be united and cohesion will obtain at temperatures considerably above those at which cohesion by means of ordinary known cements would not be possible.

The improved cement is free from the objections inherent to ordinary cements as it does not require moisture in its chemical hardening and by varying the proportion of the non-melting mineral matters its coefficient of expansion may be varied through a comparatively wide range to accord or practically accord with that of the substance or substances with which it is used.

The cement may be used by liquefying it and then applying it to the faces to be united. Or it may be used in an indirect manner by first applying it to the faces to be united, and, after setting of the cement, then joining the faces by ordinary cement or cement mortar. In either case, however, when the faces are united the joining is of such a perfect and permanent character that they will only separate under the application of destructive force.

The improved cement may be used for securing glazed or enameled bricks or tiles to ordinary bricks or tiles by first applying it to the backs of the glazed or enameled bricks or tiles and after setting joining them by ordinary cement mortar to the ordinary bricks or tiles. In such cases not only will the improved cement effect perfect cohesion but it will also prevent the alkaline stains of the ordinary cement mortar from penetrating the absorbent bodies of the glazed or enameled bricks or tiles in the course of time and staining or disfiguring the glazed or enameled faces thereof.

Owing to the perfect cohesion of the improved cement when used with smooth, glazed, enameled and like faces, it is especially suitable for fixing glazed, enameled, glass and like bricks, tiles or plates in hospitals, interiors generally, and in all cases where absolute cleanliness is of the utmost importance as it can be used without any cement, plaster work or the like of an absorbent character, without staining and without any danger of sheltering germs.

I claim—

A cement consisting of petrolene from 20 to 25 parts, asphaltene, 14 to 17 parts, and a non-melting mineral substance from 66 to 58 parts.

In testimony whereof I have affixed my signature in presence of two witnesses, this 20th day of April, 1916.

TADASHI MONIWA.

Witnesses:
NAOJIRO TAKESHITA,
MASATOMO ISODA.